(12) United States Patent
Park et al.

(10) Patent No.: US 12,252,612 B2
(45) Date of Patent: Mar. 18, 2025

(54) THERMOPLASTIC RESIN COMPOSITION AND MOLDED ARTICLE THEREFROM

(71) Applicant: LOTTE CHEMICAL CORPORATION, Seoul (KR)

(72) Inventors: Sang Ki Park, Uiwang-si (KR); Tae Gon Kang, Uiwang-si (KR)

(73) Assignee: Lotte Chemical Corporation, Seoul (KR)

( * ) Notice: Subject to any disclaimer, the term of this patent is extended or adjusted under 35 U.S.C. 154(b) by 812 days.

(21) Appl. No.: 17/607,165

(22) PCT Filed: Jun. 5, 2020

(86) PCT No.: PCT/KR2020/007324
§ 371 (c)(1),
(2) Date: Oct. 28, 2021

(87) PCT Pub. No.: WO2020/262846
PCT Pub. Date: Dec. 30, 2020

(65) Prior Publication Data
US 2022/0243056 A1  Aug. 4, 2022

(30) Foreign Application Priority Data
Jun. 28, 2019 (KR) .......................... 10-2019-0077554

(51) Int. Cl.
*C08K 3/34* (2006.01)
*C08K 5/00* (2006.01)
*C08K 5/49* (2006.01)
*C08L 69/00* (2006.01)

(52) U.S. Cl.
CPC ................ *C08L 69/00* (2013.01); *C08K 3/34* (2013.01); *C08K 5/0066* (2013.01); *C08K 5/49* (2013.01)

(58) Field of Classification Search
CPC .... C08L 69/00; C08L 2205/035; C08L 83/10; C08L 2201/02; C08L 51/04; C08L 55/02; C08L 83/04; C08K 3/34; C08K 5/0066; C08K 5/49; C08G 77/445; C08G 77/20
See application file for complete search history.

(56) References Cited

U.S. PATENT DOCUMENTS

| 2002/0077392 A1 | 6/2002 | Lim et al. |
| 2004/0249070 A1 | 12/2004 | Lim et al. |
| 2012/0165460 A1 | 6/2012 | Park et al. |
| 2013/0231414 A1 | 9/2013 | Park et al. |
| 2013/0289179 A1 | 10/2013 | Chin et al. |
| 2015/0099845 A1 | 4/2015 | Daga et al. |
| 2016/0319125 A1 | 11/2016 | Hyun et al. |
| 2020/0040181 A1 | 2/2020 | Ha et al. |

FOREIGN PATENT DOCUMENTS

| CN | 1551903 A | 12/2004 |
| CN | 102558811 A | 7/2012 |
| CN | 103180388 A | 6/2013 |
| EP | 1207182 A1 | 5/2002 |
| EP | 2471865 A1 | 7/2012 |
| KR | 10-2012-0075076 A | 7/2012 |
| KR | 20120075076 | * 7/2012 |
| KR | 10-2015-0040673 A | 4/2015 |
| KR | 10-2016-0077081 A | 7/2016 |
| KR | 10-2016-0129658 A | 11/2016 |
| KR | 10-1854433 B1 | 5/2018 |
| WO | 2018/070631 A1 | 4/2018 |
| WO | 2020/262846 A1 | 12/2020 |

OTHER PUBLICATIONS

Office Action in counterpart Chinese Application No. 202080040014.X dated Nov. 16, 2022, pp. 1-6.
Extended Search Report in counterpart European Application No. 20833289.0 dated Apr. 14, 2023, pp. 1-4.
International Search Report in counterpart International Application No. PCT/KR2020/007324 dated Sep. 15, 2020, pp. 1-5.

* cited by examiner

*Primary Examiner* — Kumar R Bhushan
(74) *Attorney, Agent, or Firm* — Additon, Pendleton & Witherspoon, P.A.

(57) ABSTRACT

A thermoplastic resin composition according to the present invention comprises: about 100 parts by weight of a polycarbonate resin; about 5 to about 15 parts by weight of a first rubber-modified vinyl-based graft copolymer in which a monomer mixture is graft-polymerized to a rubber polymer, the monomer mixture containing an aromatic vinyl-based monomer and a cyanovinyl-based monomer; about 2 to about 8 parts by weight of a second rubber-modified vinyl-based graft copolymer in which an alkyl (meth)acrylate-based monomer is graft-polymerized to a rubber polymer; about 0.5 to about 2 parts by weight of a siloxane copolyester; about 17 to about 40 parts by weight of talc; and about 13 to about 23 parts by weight of a phosphorus-based flame retardant, wherein the weight ratio of the first rubber-modified vinyl-based graft copolymer to the second rubber-modified vinyl-based graft copolymer is about 1:0.15 to about 1:0.8, and the weight ratio of the combined weight of the first rubber-modified vinyl-based graft copolymer and the second rubber-modified vinyl-based graft copolymer to the siloxane copolyester is about 1:0.03 to about 1:0.1. The thermoplastic resin composition is excellent in terms of impact resistance, hardness, mar resistance, flame retardancy, physical property balance thereof, and the like.

11 Claims, No Drawings

THERMOPLASTIC RESIN COMPOSITION AND MOLDED ARTICLE THEREFROM

CROSS-REFERENCE TO RELATED APPLICATIONS

This application claims priority to and the benefit of International Application No. PCT/KR2020/007324, filed Jun. 5, 2020, which published as WO 2020/262846 on Dec. 30, 2020, and Korean Patent Application No. 10-2019-0077554, filed in the Korean Intellectual Property Office on Jun. 28, 2019, the entire disclosure of each of which is incorporated herein by reference.

TECHNICAL FIELD

The present invention relates to a thermoplastic resin composition and a molded article produced therefrom. More particularly, the present invention relates to a thermoplastic resin composition that exhibits good properties in terms of impact resistance, rigidity, mar resistance, flame retardancy, balance therebetween, and a molded article produced therefrom.

BACKGROUND ART

Polycarbonate resins have good properties in terms of transparency, impact resistance, heat resistance, and the like, and thus are widely used as engineering materials in various fields, for example, office automation devices, materials for automobiles, construction materials, and the like. In addition, an inorganic filler-reinforced polycarbonate resin adopting inorganic fillers exhibits good properties in terms of flame retardancy, rigidity, dimensional stability, and the like to be broadly applied to interior/exterior materials for electric/electronic products.

However, the polycarbonate resin and the inorganic filler-reinforced polycarbonate resin have demerits of very low impact resistance or mar resistance.

Therefore, there is a need for development of a thermoplastic resin composition that exhibits good properties in terms of impact resistance, rigidity, mar resistance, flame retardancy, balance therebetween, and the like.

The background technique of the present invention is disclosed in KR Patent Laid-open Publication No. 10-2016-0077081 and the like.

DISCLOSURE

Technical Problem

It is one aspect of the present invention to provide a thermoplastic resin composition that exhibits good properties in terms of impact resistance, rigidity, mar resistance, flame retardancy, balance therebetween and the like.

It is another aspect of the present invention to provide a molded article formed of the thermoplastic resin composition.

The above and other aspects of the present invention can be achieved by the present invention described below.

Technical Solution

1. One aspect of the present invention relates to a thermoplastic resin composition. The thermoplastic resin composition includes: about 100 parts by weight of a polycarbonate resin; about 5 parts by weight to about 15 parts by weight of a first rubber-modified vinyl graft copolymer obtained through graft polymerization of a monomer mixture including an aromatic vinyl monomer and a vinyl cyanide monomer to a rubber polymer; about 2 parts by weight to about 8 parts by weight of a second rubber-modified vinyl graft copolymer obtained through graft polymerization of an alkyl (meth)acrylate monomer to a rubber polymer; about 0.5 parts by weight to about 2 parts by weight of siloxane copolyester; about 17 to about 40 parts by weight of talc; and about 13 parts by weight to about 23 parts by weight of a phosphorus flame retardant, wherein a weight ratio of the first rubber-modified vinyl graft copolymer to the second rubber-modified vinyl graft copolymer is about 1:0.15 to about 1:0.8 and a weight ratio of the sum of the first rubber-modified vinyl graft copolymer and the second rubber-modified vinyl graft copolymer to the siloxane copolyester is about 1:0.03 to about 1:0.1.

2. In Embodiment 1, the siloxane copolyester and the talc may be present in a weight ratio of about 1:17 to about 1:43.

3. In Embodiment 1 or 2, the second rubber-modified vinyl graft copolymer may be obtained through graft polymerization of a monomer mixture including the alkyl (meth)acrylate monomer and an aromatic vinyl monomer to the rubber polymer.

4. In Embodiments 1 to 3, the rubber polymer of the first rubber-modified vinyl graft copolymer may have a larger average particle diameter than the rubber polymer of the second rubber-modified vinyl graft copolymer.

5. In Embodiments 1 to 4, the siloxane copolyester may include a repeat unit represented by Formula 1:

[Formula 1]

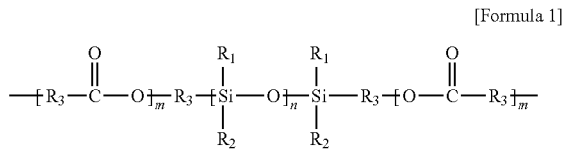

where $R_1$ and $R_2$ may be the same as or different from each other and may be a hydrogen atom, a substituted or unsubstituted $C_1$ to $C_{20}$ alkyl group, a substituted or unsubstituted $C_2$ to $C_{20}$ alkenyl group, a substituted or unsubstituted $C_2$ to $C_{20}$ alkynyl group, a substituted or unsubstituted $C_1$ to $C_{20}$ alkoxy group, a substituted or unsubstituted $C_3$ to $C_{30}$ cycloalkyl group, a substituted or unsubstituted $C_3$ to $C_{30}$ cycloalkenyl group, a substituted or unsubstituted $C_3$ to $C_{30}$ cycloalkynyl group, a substituted or unsubstituted $C_6$ to $C_{30}$ aryl group, a substituted or unsubstituted $C_6$ to $C_{30}$ aryloxy group, a substituted or unsubstituted $C_6$ to $C_{30}$ aryl group, or NRR' (where R and R' are the same as or different from each other and are a hydrogen atom or a substituted or unsubstituted $C_1$ to $C_{20}$ alkyl group); $R_3$ is a $C_1$ to $C_{10}$ alkylene group or a $C_6$ to $C_{20}$ arylene group; m is an integer of 5 to 30; and n is an integer of 5 to 50.

6. In Embodiments 1 to 5, the phosphorus flame retardant may include at least one of a phosphate compound, a phosphonate compound, a phosphinate compound, a phosphine oxide compound, and a phosphazene compound.

7. In Embodiments 1 to 6, the thermoplastic resin composition may have a notched Izod impact strength of about 5 kgf·cm/cm to about 15 kgf·cm/cm, as measured on a ⅛" thick notched Izod specimen in accordance with ASTM D256.

8. In Embodiments 1 to 7, the thermoplastic resin composition may have a tensile elongation of about 5% to about 20%, as measured on a 3.2 mm thick specimen at 5 mm/min in accordance with ASTM D638.

9. In Embodiments 1 to 8, the thermoplastic resin composition may have a difference of about 20 or less in specular gloss at about 60° (ΔGloss (60°)) between before and after rubbing about 10 times using a white cotton cloth, as measured on a specimen having a size of about 10 cm×about 15 cm using a crockmeter in accordance with ASTM D523.

10. In Embodiments 1 to 9, the thermoplastic resin composition may have a flame retardancy of V-0 or higher, as measured on a 2 mm thick specimen by a UL-94 vertical test method.

11. Another aspect of the present invention relates to a molded article. The molded article is formed of the thermoplastic resin composition according to any one of Embodiments 1 to 10.

ADVANTAGEOUS EFFECTS

The present invention provides a thermoplastic resin composition that has good properties in terms of impact resistance, rigidity, mar resistance, flame retardancy, balance therebetween, and the like, and a molded article produced therefrom.

BEST MODE

Hereinafter, embodiments of the present invention will be described in detail.

A thermoplastic resin composition according to the present invention includes: (A) a polycarbonate resin; (B) a first rubber-modified vinyl graft copolymer; (C) a second rubber-modified vinyl graft copolymer; (D) siloxane copolyester; (E) talc; and (F) a phosphorus flame retardant.

As used herein to represent a specific numerical range, the expression "a to b" means "≥a and ≤b".

(A) Polycarbonate Resin

The polycarbonate resin according to one embodiment of the invention may include any polycarbonate resin used in typical thermoplastic resin compositions. For example, the polycarbonate resin may be an aromatic polycarbonate resin prepared by reacting diphenols (aromatic diol compounds) with a precursor, such as phosgene, halogen formate, or carbonate diester.

In some embodiments, the diphenols may include, for example, 4,4'-biphenol, 2,2-bis(4-hydroxyphenyl)propane, 2,4-bis(4-hydroxyphenyl)-2-methylbutane, 1,1-bis(4-hydroxyphenyl)cyclohexane, 2,2-bis(3-chloro-4-hydroxyphenyl)propane, 2,2-bis-(3,5-dichloro-4-hydroxyphenyl)propane, 2,2-bis(3-methyl-4-hydroxyphenyl)propane, and 2,2-bis(3,5-dimethyl-4-hydroxyphenyl)propane, without being limited thereto. For example, the diphenols may be 2,2-bis(4-hydroxyphenyl)propane, 2,2-bis(3,5-dichloro-4-hydroxyphenyl)propane, 2,2-bis(3-methyl-4-hydroxyphenyl)propane, or 1,1-bis(4-hydroxyphenyl)cyclohexane, specifically 2,2-bis(4-hydroxyphenyl)propane, which is also referred to as bisphenol-A.

In some embodiments, the polycarbonate resin may be a branched polycarbonate resin. For example, the polycarbonate resin may be a polycarbonate resin prepared by adding a tri- or higher polyfunctional compound, specifically, a tri- or higher valent phenol group-containing compound, in an amount of about 0.05 mol % to about 2 mol % based on the total number of moles of the diphenols used in polymerization.

In some embodiments, the polycarbonate resin may be a homopolycarbonate resin, a copolycarbonate resin, or a blend thereof. In addition, the polycarbonate resin may be partly or completely replaced by an aromatic polyester-carbonate resin obtained by polymerization in the presence of an ester precursor, for example, a bifunctional carboxylic acid.

In some embodiments, the polycarbonate resin may have a weight average molecular weight (Mw) of about 10,000 g/mol to about 50,000 g/mol, for example, about 15,000 g/mol to about 40,000 g/mol, as measured by gel permeation chromatography (GPC). Within this range, the thermoplastic resin composition can have good fluidity (processability). In addition, the polycarbonate resin may be a mixture of at least two polycarbonate resins having different weight average molecular weights.

(B) First Rubber-Modified Vinyl Graft Copolymer

According to the present invention, the first rubber-modified vinyl graft copolymer serves to improve impact resistance of the thermoplastic resin composition and may be obtained through graft polymerization of a monomer mixture including an aromatic vinyl monomer and a vinyl cyanide monomer to a rubber polymer. For example, the first rubber-modified vinyl graft copolymer may be obtained through graft polymerization of the monomer mixture including the aromatic vinyl monomer and the vinyl cyanide monomer to the rubber polymer, in which the monomer mixture may further include a monomer for imparting processability and heat resistance, as needed. Polymerization may be performed by any suitable polymerization method known in the art, such as emulsion polymerization, suspension polymerization, and the like. In addition, the first rubber-modified vinyl graft copolymer may have a core (rubber polymer)-shell (copolymer of the monomer mixture) structure.

In some embodiments, the rubber polymer may include diene rubbers, such as polybutadiene, poly(styrene-butadiene), and poly(acrylonitrile-butadiene), saturated rubbers obtained by adding hydrogen to the diene rubbers, isoprene rubbers, $C_2$ to $C_{10}$ alkyl (meth)acrylate rubbers, copolymers of $C_2$ to $C_{10}$ alkyl (meth)acrylates and styrene, and ethylene-propylene-diene terpolymer (EPDM). These may be used alone or as a mixture thereof. For example, the rubber polymer may include diene rubbers, (meth)acrylate rubbers, specifically butadiene rubbers, butyl acrylate rubbers, and the like.

In some embodiments, the rubber polymer (rubber particle) may have an average particle diameter (z-average) of about 0.05 μm to about 6 μm, for example, about 0.15 μm to about 4 μm, specifically about 0.25 μm to about 3.5 μm, as measured using a particle size analyzer. Within this range, the thermoplastic resin composition can have good properties in terms of impact resistance, external appearance, and the like. Here, the average particle diameter can be measured by a drying method well-known in the art using a Mastersizer 2000E series analyzer (Malvern).

In some embodiments, the rubber polymer may be present in an amount of about 10% by weight (wt %) to about 70 wt %, for example, about 20 wt % to about 60 wt %, based on 100 wt % of the first rubber-modified vinyl graft copolymer, and the monomer mixture may be present in an amount of about 30 wt % to about 90 wt %, for example, about 40 wt % to about 80 wt %, based on 100 wt % of the first rubber-modified vinyl graft copolymer. Within this range, the thermoplastic resin composition can have good impact resistance.

In some embodiments, the aromatic vinyl monomer may be graft copolymerizable with the rubber polymer and may include, for example, styrene, α-methylstyrene, β-methylstyrene, p-methylstyrene, p-t-butylstyrene, ethylstyrene, vinylxylene, monochlorostyrene, dichlorostyrene, dibromostyrene, vinyl naphthalene, and the like. These may be used alone or as a mixture thereof. The aromatic vinyl monomer may be present in an amount of about 15 wt % to about 94 wt %, for example, about 20 wt % to about 80 wt %, specifically about 40 wt % to about 80 wt %, based on 100 wt % of the monomer mixture. Within this range, the thermoplastic resin composition can have good processability and the like.

In some embodiments, the vinyl cyanide monomer is copolymerizable with the aromatic vinyl monomer, and may include, for example, acrylonitrile, methacrylonitrile, ethacrylonitrile, phenyl acrylonitrile, α-chloroacrylonitrile, fumaronitrile, and the like. These may be used alone or as a mixture thereof. For example, the vinyl cyanide monomer may include acrylonitrile, methacrylonitrile, and the like. The vinyl cyanide monomer may be present in an amount of about 6 wt % to about 85 wt %, for example, about 20 wt % to about 80 wt %, specifically about 20 wt % to about 60 wt %, based on 100 wt % of the monomer mixture. Within this range, the thermoplastic resin composition can have good properties in terms of fluidity, rigidity, and the like.

In some embodiments, the monomer for imparting processability and heat resistance may include, for example, maleic anhydride, N-substituted maleimide, and the like. The monomer for imparting processability and heat resistance may be present in an amount of about 15 wt % or less, for example, about 0.1 wt % to about 10 wt %, based on 100 wt % of the monomer mixture. Within this range, the monomer for imparting processability and heat resistance can impart processability and heat resistance to the thermoplastic resin composition without deterioration in other properties.

In some embodiments, the first rubber-modified vinyl graft copolymer may include, for example, a g-ABS copolymer obtained by grafting styrene and acrylonitrile to a butadiene rubber polymer, and the like.

In some embodiments, the first rubber-modified vinyl graft copolymer may be present in an amount of about 5 parts by weight to about 15 parts by weight, for example, about 6 parts by weight to about 14 parts by weight, relative to about 100 parts by weight of the polycarbonate resin. If the content of the first rubber-modified vinyl graft copolymer is less than about 5 parts by weight relative to about 100 parts by weight of the polycarbonate resin, the thermoplastic resin composition can suffer from deterioration in impact resistance, rigidity, and the like, and if the content of the first rubber-modified vinyl graft copolymer exceeds about 15 parts by weight, the thermoplastic resin composition can suffer from deterioration in rigidity, mar resistance, flame retardancy, and the like.

(C) Second Rubber-Modified Vinyl Graft Copolymer

According to the present invention, the second rubber-modified vinyl graft copolymer serves to improve impact resistance and external appearance of the thermoplastic resin composition without deterioration in fluidity and the like and may be a graft copolymer obtained through graft polymerization of an alkyl (meth)acrylate monomer or a monomer mixture of an alkyl (meth)acrylate monomer and an aromatic vinyl monomer to a rubber polymer. For example, the second rubber-modified vinyl graft copolymer may be obtained through graft polymerization of the alkyl (meth)acrylate monomer or the monomer mixture of the alkyl (meth)acrylate monomer and the aromatic vinyl monomer to the rubber polymer. Here, polymerization may be performed by any typical polymerization method, such as emulsion polymerization, suspension polymerization, and the like. In addition, the second rubber-modified vinyl graft copolymer may have a core (rubber polymer)-shell (polymer of the alkyl (meth)acrylate monomer or the monomer mixture) structure.

In some embodiments, the rubber polymer may include, for example, diene rubbers, such as polybutadiene, poly(styrene-butadiene), and poly(acrylonitrile-butadiene); saturated rubbers obtained by adding hydrogen to the diene rubbers; isoprene rubbers; $C_2$ to $C_{10}$ alkyl (meth)acrylate rubbers; copolymers of $C_2$ to $C_{10}$ alkyl (meth)acrylate and styrene; ethylene-propylene-diene monomer terpolymer (EPDM), and the like. These may be used alone or as a mixture thereof. For example, the rubber polymer may include diene rubbers, specifically butadiene rubbers, poly(styrene-butadiene), and combinations thereof.

In some embodiments, the rubber polymer (rubber particle) may have an average particle diameter (D50) of about 0.05 μm to about 6 μm, for example, about 0.05 μm to about 3 μm, specifically about 0.09 μm to about 1.5 μm, as measured by a particle size analyzer. Within this range, the thermoplastic resin composition can have good properties in terms of impact resistance, external appearance, and the like. Here, the average particle diameter can be measured by a drying method well-known in the art using a Mastersizer 2000E series analyzer (Malvern).

In some embodiments, the rubber polymer may be present in an amount of about 10 wt % to about 80 wt %, for example, about 35 wt % to about 75 wt %, based on 100 wt% of the second rubber-modified vinyl graft copolymer, and the alkyl (meth)acrylate monomer or the monomer mixture may be present in an amount of about 20 wt % to about 90 wt %, for example, about 25 wt % to about 65 wt %, based on 100 wt % of the second rubber-modified vinyl graft copolymer. Within this range, the thermoplastic resin composition can have good impact resistance and the like.

In some embodiments, the alkyl (meth)acrylate monomer may be graft copolymerizable with the rubber polymer and may include, for example, methyl (meth)acrylate, ethyl (meth)acrylate, propyl (meth)acrylate, butyl (meth)acrylate, and the like, as an alkyl (meth)acrylate monomer copolymerizable with the aromatic vinyl monomer. These may be used alone or as a mixture thereof. The alkyl (meth)acrylate monomer may be applied alone to a shell. In the monomer mixture, the alkyl (meth)acrylate monomer may be present in an amount of about 6 wt % to about 85 wt %, for example, about 20 wt % to about 80 wt %, specifically about 40 wt % to about 80 wt %, based on 100 wt % of the monomer mixture. Within this range, the thermoplastic resin composition can have good fluidity, external appearance, and the like.

In some embodiments, the aromatic vinyl monomer may be graft copolymerizable with the rubber polymer and may include, for example, styrene, α-methylstyrene, β-methylstyrene, p-methylstyrene, p-t-butylstyrene, ethylstyrene, vinylxylene, monochlorostyrene, dichlorostyrene, dibromostyrene, vinyl naphthalene, and the like. These may be used alone or as a mixture thereof. The aromatic vinyl monomer may be present in an amount of about 15 wt % to about 94 wt %, for example, about 20 wt % to about 80 wt %, specifically about 20 wt % to about 60 wt %, based on 100 wt % of the monomer mixture. Within this range, the thermoplastic resin composition can have good processability and the like.

In some embodiments, the second rubber-modified vinyl graft copolymer may include, for example, a graft copolymer obtained by grafting methyl methacrylate to a poly(styrene-butadiene) rubber polymer, a graft copolymer obtained by grafting methyl methacrylate and styrene to a butadiene rubber polymer, and the like.

In some embodiments, the second rubber-modified vinyl graft copolymer may be present in an amount of about 2 parts by weight to about 8 parts by weight, for example, about 3 parts by weight to about 6 parts by weight, relative to about 100 parts by weight of the polycarbonate resin. If the content of the second rubber-modified vinyl graft copolymer is less than about 2 parts by weight relative to about 100 parts by weight of the polycarbonate resin, the thermoplastic resin composition can suffer from deterioration in impact resistance, rigidity, and the like, and if the content of the second rubber-modified vinyl graft copolymer exceeds about 8 parts by weight, the thermoplastic resin composition can suffer from deterioration in mar resistance, flame retardancy, and the like.

In some embodiments, a weight ratio ((B):(C)) of the first rubber-modified vinyl graft copolymer (B) to the second rubber-modified vinyl graft copolymer (C) may be about 1:0.15 to about 1:0.8, for example, about 1:0.2 to about 1:0.7. If the weight ratio deviates from this range, the thermoplastic resin composition can suffer from deterioration in impact resistance, rigidity, and the like.

(D) Siloxane Copolyester

According to the present invention, the siloxane copolyester serves to improve mar resistance of the thermoplastic resin composition without deterioration in impact resistance, rigidity and the like together with the first and second rubber-modified vinyl graft copolymers and talc, and may include a repeat unit represented by Formula 1.

[Formula 1]

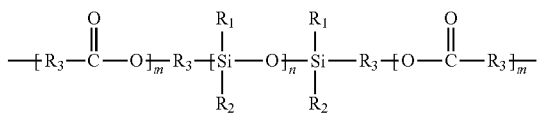

In Formula 1, $R_1$ and $R_2$ are the same as or different from each other and may be a hydrogen atom, a substituted or unsubstituted $C_1$ to $C_{20}$ alkyl group, a substituted or unsubstituted $C_2$ to $C_2$ alkenyl group, a substituted or unsubstituted $C_2$ to $C_{20}$ alkynyl group, a substituted or unsubstituted $C_1$ to $C_{20}$ alkoxy group, a substituted or unsubstituted $C_3$ to $C_{30}$ cycloalkyl group, a substituted or unsubstituted $C_3$ to $C_{30}$ cycloalkenyl group, a substituted or unsubstituted $C_3$ to $C_{30}$ cycloalkynyl group, a substituted or unsubstituted $C_6$ to $C_{30}$ aryl group, a substituted or unsubstituted $C_6$ to $C_{30}$ aryloxy group, a substituted or unsubstituted $C_6$ to $C_{30}$ aryl group, or NRR' (where R and R' are the same as or different from each other and are a hydrogen atom or a substituted or unsubstituted $C_1$ to $C_{20}$ alkyl group); $R_3$ is a $C_1$ to $C_{10}$ alkylene group or a $C_6$ to $C_{20}$ arylene group; m is an integer of 5 to 30; and n is an integer of 5 to 50.

Here, "substituted" means that a hydrogen atom is substituted with a substituent, for example, a halogen, a $C_1$ to $C_{30}$ alkyl group, a $C_1$ to $C_{30}$ halo-alkyl group, a $C_6$ to $C_{30}$ aryl group, a $C_2$ to $C_{30}$ heteroaryl group, a $C_1$ to $C_{20}$ alkoxy group, and combinations thereof In some embodiments, the siloxane copolyester may be a block copolymer in which a polyester block and a polysiloxane block have an ABA shape. For example, the siloxane copolyester may include about 30 wt % to about 70 wt % of the polyester block and about 70 wt % to about 30 wt % of the polysiloxane block. Within this range, the thermoplastic resin composition can exhibit good properties in terms of impact resistance, rigidity, mar resistance, flame retardancy, and the like.

In some embodiments, the siloxane copolyester may be prepared through polymerization of siloxane with caprolactam or through polymerization of siloxane with a diol and dicarboxylic acid.

In some embodiments, the siloxane copolyester may have a number average molecular weight (Mn) of about 5,500 g/mol to about 7,500 g/mol, for example, about 6,000 g/mol to about 7,000 g/mol, in which the polyester block in the siloxane copolyester may have a number average molecular weight (Mn) of about 1,000 g/mol to about 3,000 g/mol, for example, about 1,500 g/mol to about 2,500 g/mol, as measured by GPC (gel permeation chromatography). Within this range, the thermoplastic resin composition can exhibit good properties in terms of impact resistance, rigidity, mar resistance, and the like.

In some embodiments, the siloxane copolyester may be present in an amount of about 0.5 parts by weight to about 2 parts by weight, for example, about 0.5 parts by weight to about 1.5 parts by weight, relative to about 100 parts by weight of the polycarbonate resin. If the content of the siloxane copolyester is less than about 0.5 parts by weight relative to about 100 parts by weight of the polycarbonate resin, the thermoplastic resin composition can suffer from deterioration in impact resistance, mar resistance, and the like, and if the content of the siloxane copolyester exceeds about 2 parts by weight, the thermoplastic resin composition can suffer from deterioration in impact resistance, rigidity, flame retardancy, and the like.

In some embodiments, a weight ratio ((B+C):(D)) of the sum of the first rubber-modified vinyl graft copolymer (B) and the second rubber-modified vinyl graft copolymer (C) to the siloxane copolyester (D) may be about 1:0.03 to about 1:0.1, for example, about 1:0.05 to about 1:0.1. If the weight ratio deviates from this range, the thermoplastic resin composition can suffer from deterioration in impact resistance, rigidity, mar resistance, flame retardancy, and the like.

(E) Talc

According to the present invention, talc serves to improve mar resistance and rigidity of the thermoplastic resin composition without deterioration in impact resistance together with the siloxane copolyester and the like, and may be typical flake type talc.

In some embodiments, the talc may have an average particle diameter of about 2 μm to about 10 μm, for example, about 3 μm to about 7 μm, as measured using a scanning electron microscope (SEM). Within this range, the thermoplastic resin composition can exhibit good properties in terms of rigidity, dimensional stability, and the like.

In some embodiments, the talc may have a bulk density of about 0.3 g/cm$^3$ to about 1.0 g/cm$^3$, for example, about 0.4 g/cm$^3$ to about 0.8 g/cm$^3$. Within this range, the thermoplastic resin composition can exhibit good stiffness, dimensional stability, external appearance, and the like. Within this range, the thermoplastic resin composition can exhibit good properties in terms of rigidity, dimensional stability, and the like.

In some embodiments, the talc may be present in an amount of about 17 parts by weight to about 40 parts by weight, for example, about 20 parts by weight to about 35 parts by weight, relative to about 100 parts by weight of the polycarbonate resin. If the content of the talc is less than about 17 parts by weight relative to about 100 parts by weight of the polycarbonate resin, the thermoplastic resin composition can suffer from deterioration in mar resistance and the like, and if the content of the talc exceeds about 40 parts by weight, the thermoplastic resin composition can suffer from deterioration in impact resistance, rigidity, flame retardancy, and the like.

In some embodiments, a weight ratio ((D):(E)) of the siloxane copolyester (D) to the talc (E) may be about 1:17 to about 1:43, for example, about 1:20 to about 1:42. Within this range, the thermoplastic resin composition can exhibit good properties in terms of impact resistance, rigidity, flame retardancy, balance therebetween, and the like.

(F) Phosphorus Flame Retardant

The phosphorus flame retardant according to one embodiment of the invention may include a phosphorus flame retardant used in typical thermoplastic resin compositions. For example, the phosphorus flame retardant may include a phosphate compound, a phosphonate compound, a phosphinate compound, a phosphine oxide compound, a phosphazene compound, and metal salts thereof. These compounds may be used alone or as a mixture thereof.

In some embodiments, the phosphorus flame retardant may include an aromatic phosphoric ester compound represented by Formula 2.

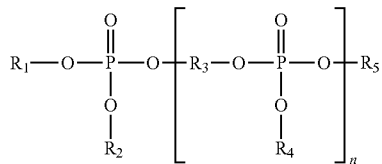

[Formula 2]

where $R_1$, $R_2$, $R_4$, and $R_5$ are each independently a hydrogen atom, a $C_6$ to $C_{20}$ (6 to 20 carbon atoms) aryl group, or a $C_1$ to $C_{10}$ alkyl group-substituted $C_6$ to $C_{20}$ aryl group; $R_3$ is a $C_6$ to $C_{20}$ arylene group or a $C_1$ to $C_{10}$ alkyl group-substituted $C_6$ to $C_{20}$ arylene group, for example, derivatives of a dialcohol, such as resorcinol, hydroquinone, bisphenol-A, or bisphenol-S; and n is an integer of 0 to 10, for example, 0 to 4.

When n is 0 in Formula 2, examples of the aromatic phosphoric ester compound may include diaryl phosphates, such as diphenyl phosphate, triphenyl phosphate, tricresyl phosphate, trixylenyl phosphate, tri(2,6-dimethylphenyl) phosphate, tri(2,4,6-trimethylphenyl) phosphate, tri(2,4-di-tert-butylphenyl) phosphate, and tri(2,6-dimethylphenyl) phosphate; when n is 1 in Formula 2, examples of the aromatic phosphoric ester compound may include bisphenol-A bis(diphenyl phosphate), resorcinol bis(diphenyl phosphate), resorcinol bis[bis(2,6-dimethylphenyl)phosphate], resorcinol bis[bis(2,4-di-tert-butylphenyl) phosphate], hydroquinone bi s[bi s(2,6-dimethylphenyl)phosphate], hydroquinone bis(diphenyl phosphate), and hydroquinone bis[bis(2,4-di-tert-butylphenyl)phosphate]; and when n is 2 or more in Formula 1, the aromatic phosphoric ester compound may be an oligomer type phosphoric ester compound, without being limited thereto. These compounds may be used alone or as a mixture thereof.

In some embodiments, the phosphorus flame retardant may be present in an amount of about 13 parts by weight to about 23 parts by weight, for example, about 15 parts by weight to about 20 parts by weight, relative to about 100 parts by weight of the polycarbonate resin. If the content of the phosphorus flame retardant is less than about 13 parts by weight relative to about 100 parts by weight of the polycarbonate resin, the thermoplastic resin composition can suffer from deterioration in flame retardancy and the like, and if the content of the phosphorus flame retardant exceeds about 23 parts by weight, the thermoplastic resin composition can suffer from deterioration in impact resistance, rigidity, and the like.

The thermoplastic resin composition according to one embodiment of the invention may further include additives used for typical thermoplastic resin compositions. Examples of the additives may include antioxidants, lubricants, release agents, nucleating agents, stabilizers, pigments, dyes, and mixtures thereof, without being limited thereto. The additives may be present in an amount of about 0.001 parts by weight to about 40 parts by weight, for example, about 0.1 parts by weight to about 10 parts by weight, relative to about 100 parts by weight of the polycarbonate resin.

The thermoplastic resin composition according to one embodiment of the invention may be prepared in pellet form by mixing the aforementioned components, followed by melt extrusion at about 200° C. to about 280° C., for example, about 220° C. to about 260° C., using a typical twin-screw extruder.

In some embodiments, the thermoplastic resin composition may have a notched Izod impact strength of about 5 kgf·cm/cm to about 15 kgf·cm/cm, for example, about 6 kgf·cm/cm to about 13 kgf·cm/cm, as measured on a ⅛" thick specimen in accordance with ASTM D256.

In some embodiments, the thermoplastic resin composition may have a tensile elongation of about 5% to about 20%, for example, about 5.5% to about 12%, as measured on a 3.2 mm thick specimen under conditions of 5 mm/min in accordance with ASTM D638.

In some embodiments, the thermoplastic resin composition may have a difference of about 20 or less, for example, about 10 to about 20, in specular gloss at about 60° (ΔGloss (60°))between before and after rubbing about 10 times using a white cotton cloth, as measured on a specimen having a size of about 10 cm×about 15 cm using a crockmeter in accordance with ASTM D523.

In some embodiments, the thermoplastic resin composition may have a flame retardancy of V0 or higher, as measured on a 1.2 mm thick specimen by a UL-94 50W vertical test method.

A molded article according to the present invention is formed of the thermoplastic resin composition set forth above. The thermoplastic resin composition may be prepared in pellet form. The prepared pellets may be produced into various molded articles (products) by various molding methods, such as injection molding, extrusion molding, vacuum molding, and casting. These molding methods are well known to those skilled in the art. The molded product has good properties in terms of impact resistance, rigidity, mar resistance, flame retardancy, and balance therebetween, and thus can be advantageously used for interior/exterior materials for electrical/electronic products and the like.

Mode for Invention

Next, the present invention will be described in more detail with reference to some examples. It should be understood that these examples are provided for illustration only and are not to be construed in any way as limiting the invention.

EXAMPLE

Details of components used in Examples and Comparative Examples are as follows.
(A) Polycarbonate Resin
A bisphenol-A polycarbonate resin having a weight average molecular weight (Mw) of 25,000 g/mol was used.
(B) First Rubber-Modified Vinyl Graft Copolymer
g-ABS obtained through graft polymerization of 55 wt % of styrene and acrylonitrile (weight ratio: 71/29) to 45 wt % of butadiene rubber (average particle diameter: 310 nm) was used.
(C) Second Rubber-Modified Vinyl Graft Copolymer
A rubber-modified vinyl graft copolymer obtained through graft polymerization of 30 wt % of methyl methacrylate and styrene (weight ratio: 70/30) to 70 wt % of butadiene rubber (average particle diameter: 100 nm) was used.

(D) Siloxane Polymer
(D1) Siloxane copolyester (Manufacturer: Evonik Co., Ltd., Product Name: TEGOMER H-Si6440P) was used.
(D2) Polymethylphenylsiloxane (Manufacturer: GE Toshiba Co., Ltd., Product Name: TSF 437) was used.
(E) Inorganic Filler
(E1) Talc (Manufacturer: TIMCAL Co., Ltd., Product Name: UPN HS-T 0.5) was used.
(E2) Mica (Manufacturer: Nyco Co., Ltd., Product Name: Nyglos 4W) was used.
(F) Phosphorus Flame Retardant
Bisphenol-A bis(diphenyl phosphate) (Manufacturer: Yoke Chemical Co., Ltd., Product Name: YOKE BDP) was used.

Examples 1 to 8 and Comparative Examples 1 to 14

The above components were mixed in amounts as listed in Tables 1 to 3 and subjected to extrusion under conditions of 230° C., thereby preparing a thermoplastic resin composition in pellet form. Here, extrusion was performed using a twin-screw extruder (L/D=36, Φ: 45 mm) and the prepared pellets were dried at 80° C. for 2 hours or more and injection-molded in a 6 oz. injection molding machine (molding temperature: 230° C., mold temperature: 60° C.), thereby preparing specimens. The prepared specimens were evaluated as to the following properties by the following method, and results are shown in Table 1.

Property Measurement (1) Impact resistance: Notched Izod impact strength (kgf·cm/cm) was measured on a ⅛" thick specimen in accordance with ASTM D256.
(2) Rigidity: Tensile elongation (unit: %) was measured on a 3.2 mm thick specimen under conditions of 5 mm/min in accordance with ASTM D638.
(3) Mar resistance: A difference in specular gloss at about 60° (ΔGloss (60°)) between before and after rubbing about 10 times, 50 times and 100 times using a white cotton cloth was measured on a specimen having a size of about 10 cm×about 15 cm using a crockmeter in accordance with ASTM D523.
(4) Flame retardancy: Flame retardancy was measured on a 1.2 mm thick specimen and a 2.5 mm thick specimen by a UL-94 vertical test method.

TABLE 1

|  | Example |  |  |  |  |  |  |  |
|---|---|---|---|---|---|---|---|---|
|  | 1 | 2 | 3 | 4 | 5 | 6 | 7 | 8 |
| (A) (parts by weight) | 100 | 100 | 100 | 100 | 100 | 100 | 100 | 100 |
| (B) (parts by weight) | 7 | 13 | 10 | 10 | 10 | 10 | 10 | 10 |
| (C) (parts by weight) | 4.3 | 4.3 | 3.3 | 5.3 | 4.3 | 4.3 | 4.3 | 4.3 |
| (D1) (parts by weight) | 1 | 1 | 1 | 1 | 0.7 | 1.4 | 1 | 1 |
| (D2) (parts by weight) | — | — | — | — | — | — | — | — |
| (E1) (parts by weight) | 28.6 | 28.6 | 28.6 | 28.6 | 28.6 | 28.6 | 25 | 35 |
| (E2) (parts by weight) | — | — | — | — | — | — | — | — |
| (F) (parts by weight) | 17.1 | 17.1 | 17.1 | 17.1 | 17.1 | 17.1 | 17.1 | 17.1 |
| Notched Izod strength (kgf · cm/cm) | 6.8 | 12.6 | 7.9 | 10.8 | 6.5 | 8.0 | 10.2 | 6.4 |
| Tensile elongation (%) | 5.6 | 11.9 | 9.5 | 10.5 | 5.5 | 9.6 | 10.4 | 5.5 |
| Difference in specular gloss | 16.5 | 15.8 | 16.2 | 16.1 | 18.1 | 12.4 | 16.9 | 14.8 |
| Flame retardancy | V-0 | V-0 | V-0 | V-0 | V-0 | V-0 | V-0 | V-0 |

TABLE 2

|  | Comparative Example |  |  |  |  |  |  |
|---|---|---|---|---|---|---|---|
|  | 1 | 2 | 3 | 4 | 5 | 6 | 7 |
| (A) (parts by weight) | 100 | 100 | 100 | 100 | 100 | 100 | 100 |
| (B) (parts by weight) | 5 | 15 | 10 | 10 | 10 | 10 | 10 |
| (C) (parts by weight) | 4.3 | 4.3 | 2.5 | 6 | 4.3 | 4.3 | 4.3 |
| (D1) (parts by weight) | 1 | 1 | 1 | 1 | 0.5 | 2 | — |
| (D2) (parts by weight) | — | — | — | — | — | — | 1 |
| (E1) (parts by weight) | 28.6 | 28.6 | 28.6 | 28.6 | 28.6 | 28.6 | 28.6 |
| (E2) (parts by weight) | — | — | — | — | — | — | — |
| (F) (parts by weight) | 17.1 | 17.1 | 17.1 | 17.1 | 17.1 | 17.1 | 17.1 |
| Notched Izod strength (kgf · cm/cm) | 4.1 | 15.1 | 3.4 | 11.5 | 3.8 | 4.2 | 3.9 |
| Tensile elongation (%) | 4.9 | 18.2 | 2.8 | 10.8 | 4.4 | 3.8 | 3.6 |
| Difference in specular gloss | 16.4 | 22.4 | 16.2 | 23.4 | 32.9 | 12.5 | 28.1 |
| Flame retardancy | V-0 | V-1 | V-0 | V-1 | V-0 | V-2 | V-0 |

TABLE 3

| | Comparative Example | | | | | | |
|---|---|---|---|---|---|---|---|
| | 8 | 9 | 10 | 11 | 12 | 13 | 14 |
| (A) (parts by weight) | 100 | 100 | 100 | 100 | 100 | 100 | 100 |
| (B) (parts by weight) | 10 | 10 | 10 | 10 | 10 | 7 | 7 |
| (C) (parts by weight) | 4.3 | 4.3 | 4.3 | 4.3 | 4.3 | 7 | 4.3 |
| (D1) (parts by weight) | 1 | 1 | 1 | 1 | 1 | 1 | 1.5 |
| (D2) (parts by weight) | — | — | — | — | — | — | — |
| (E1) (parts by weight) | 20 | 40 | — | 28.6 | 28.6 | 28.6 | 28.6 |
| (E2) (parts by weight) | — | — | 28.6 | — | — | — | — |
| (F) (parts by weight) | 17.1 | 17.1 | 17.1 | 12 | 20 | 17.1 | 17.1 |
| Notched Izod strength (kgf · cm/cm) | 11.6 | 2.6 | 3.2 | 15.6 | 2.8 | 8.9 | 4.2 |
| Tensile elongation (%) | 10.8 | 1.1 | 1.4 | 15.4 | 2.9 | 7.2 | 5.8 |
| Difference in specular gloss | 22.5 | 12.9 | 16.1 | 16.5 | 16.5 | 22.1 | 15.5 |
| Flame retardancy | V-0 | V-2 | V-0 | V-2 | V-0 | V-0 | V-0 |

From the result, it can be seen that the thermoplastic resin composition according to the present invention has good properties in terms of impact resistance, rigidity, mar resistance, flame retardancy, balance therebetween, and the like.

Conversely, it could be seen that the thermoplastic resin composition of Comparative Example 1 prepared using an insufficient amount of the first rubber-modified vinyl graft copolymer suffered from deterioration in impact resistance, rigidity, and the like, and the thermoplastic resin composition of Comparative Example 2 prepared using an excess of the first rubber-modified vinyl graft copolymer suffered from deterioration in mar resistance, flame retardancy, and the like. It could be seen that the thermoplastic resin composition of Comparative Example 3 prepared using an insufficient amount of the second rubber-modified vinyl graft copolymer suffered from deterioration in impact resistance, rigidity, and the like, and the thermoplastic resin composition of Comparative Example 4 prepared using an excess of the second rubber-modified vinyl graft copolymer suffered from deterioration in mar resistance, flame retardancy, and the like. It could be seen that the thermoplastic resin composition of Comparative Example 5 prepared using an insufficient amount of the siloxane copolyester suffered from deterioration in impact resistance, mar resistance, and the like; the thermoplastic resin composition of Comparative Example 6 prepared using an excess of the siloxane copolyester suffered from deterioration in impact resistance, rigidity, flame retardancy, and the like; and the thermoplastic resin composition of Comparative Example 7 prepared using polymethylphenylsiloxane (D2) instead of the siloxane copolyester according to the present invention suffered from deterioration in impact resistance, mar resistance, and the like. It could be seen that the thermoplastic resin composition of Comparative Example 8 prepared using an insufficient amount of talc suffered from deterioration in mar resistance and the like; the thermoplastic resin composition of Comparative Example 9 prepared using an excess of talc suffered from deterioration in impact resistance, rigidity, flame retardancy, and the like; and the thermoplastic resin composition of Comparative Example 10 prepared using mica (E2) instead of talc suffered from deterioration in impact resistance, rigidity, and the like. Further, it could be seen that the thermoplastic resin composition of Comparative Example 11 prepared using an insufficient amount of the phosphorus flame retardant suffered from deterioration in flame retardancy and the like; and the thermoplastic resin composition of Comparative Example 12 prepared using an excess of the phosphorus flame retardant suffered from deterioration in impact resistance, rigidity, and the like. Further, it could be seen that the thermoplastic resin composition of Comparative Example 13 prepared using the first rubber-modified vinyl graft copolymer (B) and the second rubber-modified vinyl graft copolymer (C) in a weight ratio (B:C) of 1:1 suffered from deterioration in mar resistance and the like, and the thermoplastic resin composition of Comparative Example 14 prepared using the first rubber-modified vinyl graft copolymer and the second rubber-modified vinyl graft copolymer in a weight ratio 1:0.13 suffered from deterioration in impact resistance and the like.

It should be understood that various modifications, changes, alterations, and equivalent embodiments can be made by those skilled in the art without departing from the spirit and scope of the present invention.

The invention claimed is:

1. A thermoplastic resin composition comprising:
   about 100 parts by weight of a polycarbonate resin;
   about 5 parts by weight to about 15 parts by weight of a first rubber-modified vinyl graft copolymer obtained through graft polymerization of a monomer mixture comprising an aromatic vinyl monomer and a vinyl cyanide monomer to a rubber polymer;
   about 2 parts by weight to about 8 parts by weight of a second rubber-modified vinyl graft copolymer obtained through graft polymerization of an alkyl (meth) acrylate monomer to a rubber polymer;
   about 0.5 parts by weight to about 2 parts by weight of siloxane copolyester;
   about 17 to about 40 parts by weight of talc; and
   about 13 parts by weight to about 23 parts by weight of a phosphorus flame retardant,
   wherein a weight ratio of the first rubber-modified vinyl graft copolymer to the second rubber-modified vinyl graft copolymer is about 1:0.15 to about 1:0.8 and a weight ratio of the sum of the first rubber-modified vinyl graft copolymer and the second rubber-modified vinyl graft copolymer to the siloxane copolyester is about 1:0.03 to about 1:0.1.

2. The thermoplastic resin composition according to claim 1, wherein the siloxane copolyester and the talc are present in a weight ratio of about 1:17 to about 1:43.

3. The thermoplastic resin composition according to claim 1, wherein the second rubber-modified vinyl graft copolymer is obtained through graft polymerization of a monomer mixture comprising the alkyl (meth) acrylate monomer and an aromatic vinyl monomer to the rubber polymer.

4. The thermoplastic resin composition according to claim 1, wherein the rubber polymer of the first rubber-modified vinyl graft copolymer has a larger average particle diameter than the rubber polymer of the second rubber-modified vinyl graft copolymer.

5. The thermoplastic resin composition according to claim 1, wherein the siloxane copolyester comprises a repeat unit represented by Formula 1:

[Formula 1]

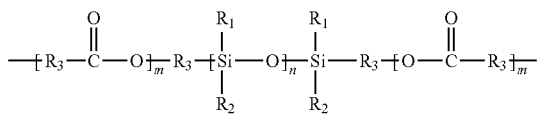

wherein $R_1$ and $R_2$ are the same as or different from each other and are a hydrogen atom, a substituted or unsubstituted $C_1$ to $C_{20}$ alkyl group, a substituted or unsubstituted $C_2$ to $C_{20}$ alkenyl group, a substituted or unsubstituted $C_2$ to $C_{20}$ alkynyl group, a substituted or unsubstituted $C_1$ to $C_{20}$ alkoxy group, a substituted or unsubstituted $C_3$ to $C_{30}$ cycloalkyl group, a substituted or unsubstituted $C_3$ to $C_{30}$ cycloalkenyl group, a substituted or unsubstituted $C_3$ to $C_{30}$ cycloalkynyl group, a substituted or unsubstituted $C_6$ to $C_{30}$ aryl group, a substituted or unsubstituted $C_6$ to $C_{30}$ aryloxy group, a substituted or unsubstituted $C_6$ to $C_{30}$ aryl group, or NRR' wherein R and R' being the same as or different from each other and being a hydrogen atom or a substituted or unsubstituted $C_1$ to $C_{20}$ alkyl group; $R_3$ is a $C_1$ to $C_{10}$ alkylene group or a $C_6$ to $C_{20}$ arylene group; m is an integer of 5 to 30; and n is an integer of 5 to 50.

6. The thermoplastic resin composition according to claim 1, wherein the phosphorus flame retardant comprises a phosphate compound, a phosphonate compound, a phosphinate compound, a phosphine oxide compound, and/or a phosphazene compound.

7. The thermoplastic resin composition according to claim 1, wherein the thermoplastic resin composition has a notched Izod impact strength of about 5 kgf·cm/cm to about 15 kgf·cm/cm, as measured on a ⅛" thick notched Izod specimen in accordance with ASTM D256.

8. The thermoplastic resin composition according to claim 1, wherein the thermoplastic resin composition has a tensile elongation of about 5% to about 20%, as measured on a 3.2 mm thick specimen at 5 mm/min in accordance with ASTM D638.

9. The thermoplastic resin composition according to claim 1, wherein the thermoplastic resin composition has a difference of about 20 or less in specular gloss at about 60° (ΔGloss)) (60° between before and after rubbing about 10 times using a white cotton cloth, as measured on a specimen having a size of about 10 cm×about 15 cm using a crockmeter in accordance with ASTM D523.

10. The thermoplastic resin composition according to claim 1, wherein the thermoplastic resin composition has a flame retardancy of V-0 or higher, as measured on a 2 mm thick specimen by a UL-94 vertical test method.

11. A molded article formed of the thermoplastic resin composition according to claim 1.

* * * * *